United States Patent
Buschbeck et al.

(10) Patent No.: US 8,334,897 B2
(45) Date of Patent: Dec. 18, 2012

(54) DIRECTION-CONTROLLED ILLUMINATION UNIT FOR AN AUTOSTEREOSCOPIC DISPLAY

(75) Inventors: Steffen Buschbeck, Jena (DE); Jean-Christophe Olaya, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 803 days.

(21) Appl. No.: 12/439,299

(22) PCT Filed: Aug. 28, 2007

(86) PCT No.: PCT/EP2007/058917
§ 371 (c)(1),
(2), (4) Date: Jul. 27, 2009

(87) PCT Pub. No.: WO2008/025765
PCT Pub. Date: Mar. 6, 2008

(65) Prior Publication Data
US 2009/0303314 A1    Dec. 10, 2009

(30) Foreign Application Priority Data
Sep. 1, 2006 (DE) .................. 10 2006 042 325

(51) Int. Cl.
*H04N 13/04* (2006.01)

(52) U.S. Cl. ............... 348/59; 348/54; 348/55; 348/56; 348/57; 348/58

(58) Field of Classification Search ............ 348/59
See application file for complete search history.

(56) References Cited

U.S. PATENT DOCUMENTS

| | | | | | |
|---|---|---|---|---|---|
| 5,579,134 | A | * | 11/1996 | Lengyel | 349/62 |
| 5,966,167 | A | * | 10/1999 | Nose et al. | 348/59 |
| 6,091,547 | A | * | 7/2000 | Gardiner et al. | 359/625 |
| 6,843,564 | B2 | * | 1/2005 | Putilin et al. | 353/7 |
| 7,357,510 | B2 | * | 4/2008 | Kim et al. | 353/7 |
| 7,561,217 | B2 | * | 7/2009 | Hu et al. | 349/15 |
| 2002/0154215 | A1 | * | 10/2002 | Schechterman et al. | 348/51 |
| 2005/0041311 | A1 | * | 2/2005 | Mi et al. | 359/831 |
| 2006/0221642 | A1 | * | 10/2006 | Daiku | 362/626 |
| 2007/0268590 | A1 | * | 11/2007 | Schwerdtner | 359/619 |
| 2009/0174700 | A1 | * | 7/2009 | Daiku | 345/214 |
| 2009/0201363 | A1 | * | 8/2009 | Grossmann | 348/59 |
| 2009/0244270 | A1 | * | 10/2009 | Takagi et al. | 348/58 |
| 2009/0303314 | A1 | * | 12/2009 | Buschbeck et al. | 348/51 |

FOREIGN PATENT DOCUMENTS

| | | |
|---|---|---|
| DE | 10 2005 012 348 | 3/2005 |
| EP | 0 791 847 | 8/1997 |
| GB | 2 405 519 | 3/2005 |
| WO | WO 2006/089542 | 8/2006 |

OTHER PUBLICATIONS

International Search Report, dated Dec. 4, 2007, issued in priority International Application No. PCT/EP2007/058917.

* cited by examiner

*Primary Examiner* — Hieu Hoang
(74) *Attorney, Agent, or Firm* — Saul Ewing LLP

(57) ABSTRACT

A direction-controlled illumination unit for an autostereoscopic display, which unit deflects light from activated illumination elements through a transmissive image reproduction means in the space in front of the display into visibility areas, from which a stereoscopic and/or monoscopic representation can be seen. The direction-controlled illumination unit contains an illumination means having illumination elements, an imaging means having imaging elements, a prism arrangement, a light-scattering means and an image reproduction means. A respective imaging element is assigned a number of illumination elements in order to deflect light in the form of a beam onto observers' eyes in a sequential manner in terms of time.

7 Claims, 3 Drawing Sheets

DIRECTION-CONTROLLED ILLUMINATION UNIT FOR AN AUTOSTEREOSCOPIC DISPLAY

CROSS REFERENCE TO RELATED APPLICATIONS

This application claims the priority of PCT/EP2007/058917, filed on Aug. 28, 2007, which claims priority to DE 10 2006 042325.9, filed Sep. 1, 2006, the entire contents of which are hereby incorporated in total by reference.

BACKGROUND OF THE INVENTION

The invention relates to a directional illumination unit for an autostereoscopic display, which deflects light from activated illumination elements through a transmissive image reproduction means into visibility regions within the space in front of the display. Out of these visibility regions, after the light has been modulated with image or other information in the image reproduction means, viewer eyes can see a stereoscopic and/or monoscopic representation in good imaging quality.

FIELD OF THE INVENTION

Field of application of the invention is autostereoscopic displays where the visibility region by means of a tracking and image control can be automatically tracked to the eyes of different viewers when the viewers move to other positions in a relatively wide viewing space in front of the display. According to the invention the images and other information can be optionally represented to the viewers either in 2D or 3D mode or in mixed mode.

In this document, displays are referred to as autostereoscopic displays when at least one viewer can view a 3D image representation without using additional aids.

In this document, the directional illumination unit of the autostereoscopic display, in direction of propagation of the light, includes an illumination means with a multitude of self-luminous or transmissive illumination elements and an imaging means with imaging elements. The imaging elements image the light of activated illumination elements of the imaging means as visibility region onto one viewer eye in each case using bundles of nearly parallel rays. Each imaging element images a multitude of activated illumination elements. The imaging means can include additional optical elements for improving the imaging conditions.

For each viewer a homogenity of the illumination of the image reproduction means is to be ensured constantly out of the homogeneously illuminated visibility region in large areas and cross talk onto the other eye avoided as well, when 3D representation is realized. The visibility region can be pre-given in different shapes and in its size can include one or both eyes of a viewer. Also when the viewer takes a new position in the space in front of the display, the monoscopic and/or stereoscopic representations have constantly to be available to him or her in good quality.

If stereoscopic representation is performed for, for example, two viewers using an autostereoscopic display of the type described, four visibility regions must be provided for four different eye positions. Various problems have to be considered to achieve good imaging quality for a bigger number of viewers.

In the interest of an acceptable user comfort, for example, it must be given priority to that the visibility regions for both eyes of one viewer be sufficiently distant from the visibility regions for the eyes of the other viewer, in order to exclude mutual obstruction when the current representation is viewed on the autostereoscopic display. It is known, however, that the optical imaging conditions are maintained most precisely for a viewer whose eyes are central in front of the display near to the optical axis of it. On the one hand, the imaging conditions get worse with growing lateral distance of the viewer eyes to the centre of the display due to increasing radiation angles of the ray bundles. If a lenticular, for example, is used as imaging means, optical aberrations occur, which do not allow great viewer angles. It can happen that the light rays do not reach a viewer at all who is situated too far from the centre of the display. On the other hand, these aberrations can prevent defined visibility regions from being generated with their pre-given extension.

The viewer angle or viewer region here is defined starting from the viewer as a space or region in front of the display where viewers can stay and see a representation in the desired mode.

Further, because of the aberrations, disadvantageous effects can occur in the visibility regions, such as inhomogeneous illumination or/and cross talk of the visibility regions for the right and the left eye. In summary, all problems listed are the more disadvantageous, the more viewers want to view the information represented and/or the more unfavourable the position of a viewer relative to the optical axis of the display is.

Therefore, in the applicant's document DE 10 2005 012 348, which has not been published yet, it is proposed to solve these problems by that a combination of deflection means with prismatic deflection elements arranged matrix-like and optical deviation means be placed in the imaging light path of the display for extending the viewer region.

Hereby the deflection elements are periodically arranged in groups in accordance with the vertical rasterization of the illumination matrix, whereby each element of the group deflects the ray bundles at a different predetermined angle. Each group of deflection elements is repeated offset periodically on each row and in each column. This combination enlarges the deflection range of the display and deflects the ray bundles each in different directions in the space in front of the display such that several visibility regions offset horizontally are created according to the determined number of viewer eyes.

However, in practice, it has shown that due to the refractive surfaces of the vast number of prisms arranged on each row and in each column total reflections occur and the imaging quality of the system is deteriorated so that homogeneous illumination is no longer provided. Furthermore, manufacture of the deflection means as an optical unit and assembly, or alignment, of them in autostereoscopic displays require high accuracy.

SUMMARY OF THE INVENTION

It is the objective of the invention to configure the guidance of light in an autostereoscopic display with directional illumination unit as described above based on simple optical means in such a manner that at the same time several viewers from visibility regions assigned to them can view a 2D and/or 3D representation in a space in front of the display free from disturbances. Hereby, the space reachable by a tracking and image control in front of the display is to be relatively large. Further, the arrangement of the optical means is designed to be such that at the same time, compared with prior art, enhanced imaging quality of the autostereoscopic display will be reached.

The present invention starts from a directional illumination unit that is controlled by a tracking and image controller, imaging through a transmissive image reproduction means ray bundles for several viewers whose eye positions are at different places in a viewer space, as visibility regions with defined size. The directional illumination unit includes an illumination means with a multitude of individually activatable, matrix-like arranged illumination elements, an imaging means with imaging elements functioning one-dimensionally arranged parallel to each other, a prism arrangement with a three-part prism structure, which recurs in horizontal direction, a means which balances the light distribution, and an image reproduction means, which contains image elements. A certain number of illumination elements is assigned to one imaging means in each case, such as a rod-type cylindrical lens, in order to image the light of activated illumination elements as ray bundle through the image reproduction means time-sequentially onto one viewer eye each. The ray bundles each assigned to one viewer eye overlapping in a defined visibility region are modulated with separate image sequences so that from the visibility region a viewer can view a representation in the mode chosen.

The problem is solved by the invention by that in the light path of the directional illumination unit of the autostereoscopic display the imaging means together with the prism arrangement is positioned at an equal set angle $\alpha > 0°$ of inclination to the vertical axis of the image reproduction means, whereby one prism element and one imaging element in each case have the same grid dimension, forming a functional optical unit in order to enlarge a horizontal deflection range for the ray bundles created, and whereby the angle of inclination, $\alpha$, is geometrically-optically dimensioned in its value such that it in combination with the means that balances the light distribution in vertical direction homogenizes the brightness in the range to be illuminated of the imaging means.

The three-part prism structure preferably consists of prism elements configured rod-like arranged parallel to each other, whereby in each case two of the prism elements have optical surfaces inclined in opposing directions and a prism element with a flat surface is placed between them.

The grid dimension of the individual prism elements of the three-part prism structure is adapted, for example, to the grid dimension of a cylindrical lense, enabling that in each case a cylindrical lense of the lenticular and a prism element of the prism arrangement form a functional optical unit.

In an advantageous realization of the invention, by use of such units aberrations and total reflections are reduced, or prevented, respectively, in contrast to the state-of-the-art.

According to the invention both the image elements and the illumination elements are determined two-dimensionally for the inverse ray tracing. This allows calculating the number of the illumination elements to be activated on each row and in each column at a higher degree of accuracy.

In an example of embodiment, the imaging means is a lenticular of rod-shaped cylindrical lenses, to which the three-part prism structure is arranged opposite as near as possible. In a further embodiment of the invention, a field lens additionally being assigned to the imaging means in order to improve the quality of imaging.

Furthermore, it is practical for the exact establishment of the defined visibility region to provide the illumination means, the imaging means and the prism arrangement each with a stripe polarizer in order to suppress secondary ray bundles. The means that balances the light distribution in vertical direction can selectively configured to be either an element that disperses only vertically or an arrangement of cylindrical lenses arranged horizontally with a very fine grid dimension.

The advantages of the invention consist in that by the embodiments of the optical means and the combinations described thereof, compared with prior art described above, defined visibility regions of high brightness and high contrast and small mutual cross talk as well are produced in a larger viewer space in front of the autostereoscopic display, and homogeneous illumination of the image reproduction means is achieved. A further advantage is that viewing of monoscopic or/and stereoscopic representations is possible from individually assigned visibility regions without mutual obstructions of the viewers. Thus, free and independent movability of the viewers in an extended viewer space is made possible, which is also connected with an extension of the tracking range.

BRIEF DESCRIPTION OF THE DRAWINGS

In the following, the invention is described in greater detail by examples of embodiment. In the accompanying drawing it is shown by FIG. 1 a schematic top view of the arrangement of the main components of an autostereoscopic display according to the invention.

The invention is based on an autostereoscopic display the working principle of which has already been described in the state-of-the-art to the extent as being necessary for understanding the present invention.

Figure 1:
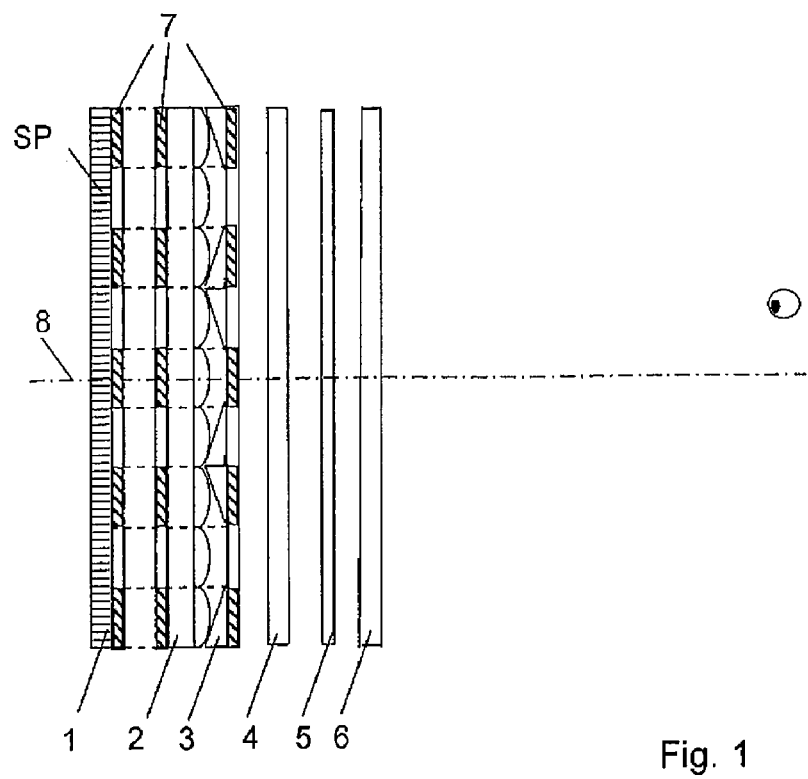

In FIG. 1, one after the other in direction of light, the main components illumination means 1, imaging means 2, prism arrangement 3, field lens 4, a means balancing a light distribution in vertical direction 5 and a transmissive image reproduction means 6 of the autostereoscopic display are schematically shown. The image reproduction means 6 is provided with regularly arranged image elements. Near to the illumination means 1 and the imaging means 2 and behind the prism arrangement 3 there is a stripe polarizer 7 each. The stripe polarizers 7 are placed relative to each other in a way that stripes of equal polarization are positioned congruently opposing each other. The width of the stripes of the stripe polarizers 7 is equal to the width of the imaging elements of the imaging means 2. This ensures that after activating illumination elements SP the light coming from there is strictly channeled as ray bundles in regions of equal direction of polarization, in the drawing illustrated by dashed lines between the stripe polarizers 7. The secondary ray bundles generated by the regular angles of radiation of every illumination element SP are simultaneously suppressed in regions of different direction of polarization.

The optical axis of the display is marked with 8.

In a viewer space in front of the display, the position of a viewer is indicated by the representation of an eye.

Figure 2:
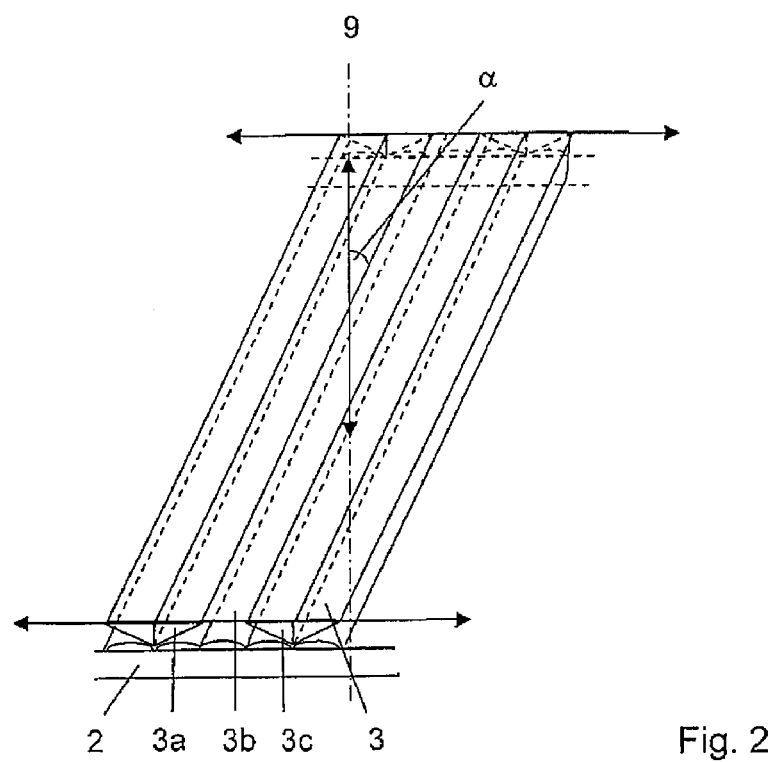
FIG. 2 a schematic perspective view of the components lenticular and prism arrangement, which are rotated by an inclination angle $\alpha$ to the vertical axis of the display.

According to FIG. 2, as important parts of the directional illumination unit the imaging means 2 with a prism arrangement 3 arranged above, including a prism structure of three repeating prism elements 3a, 3b and 3c, are in parts schematically shown in a perspective view. The arrows in FIG. 2 show that the components 2 and 3 continue to either side to create large-area optically active components. Both the imaging means 2 and the prism arrangement 3 are positioned at the same pre-given angle of inclination, α>0°, to the vertical axis of the image reproduction means 6, marked with 9.

Figure 3A:
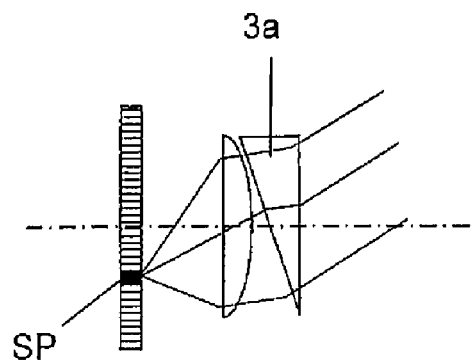
FIG. 3a . . . 3c schematic representations of functional optical units including an imaging element and a prism element, which image activated illumination elements as ray bundles in different directions each.
Figure 3B:
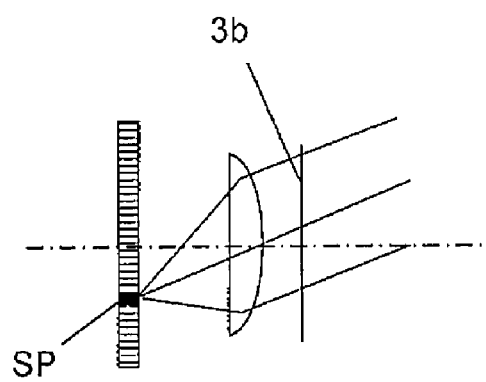
Figure 3C:
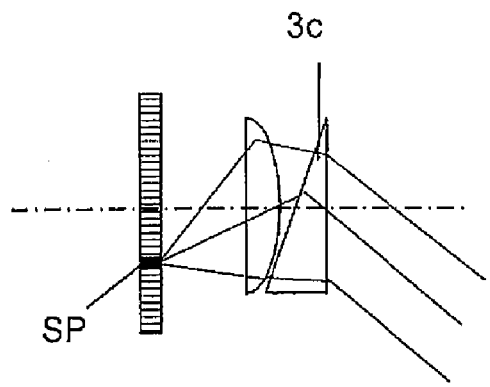

In FIGS. 3a to 3c, as details, only the prism elements 3a to 3c in combination with an imaging element, such as a cylindrical lens of a lenticular, as functional units for imaging activated illumination elements SP are schematically shown. Said prism elements 3a to 3c create nearly parallel ray bundles, which superimpose in the visibility region. According to their arrangement in the light path, the prism elements 3a and 3c allow the horizontal deflection of the ray bundle in the space in front of the display at a set, desired angle to the right or left, whereas the light passes the prism element 3b without being deflected.

Figure 4:
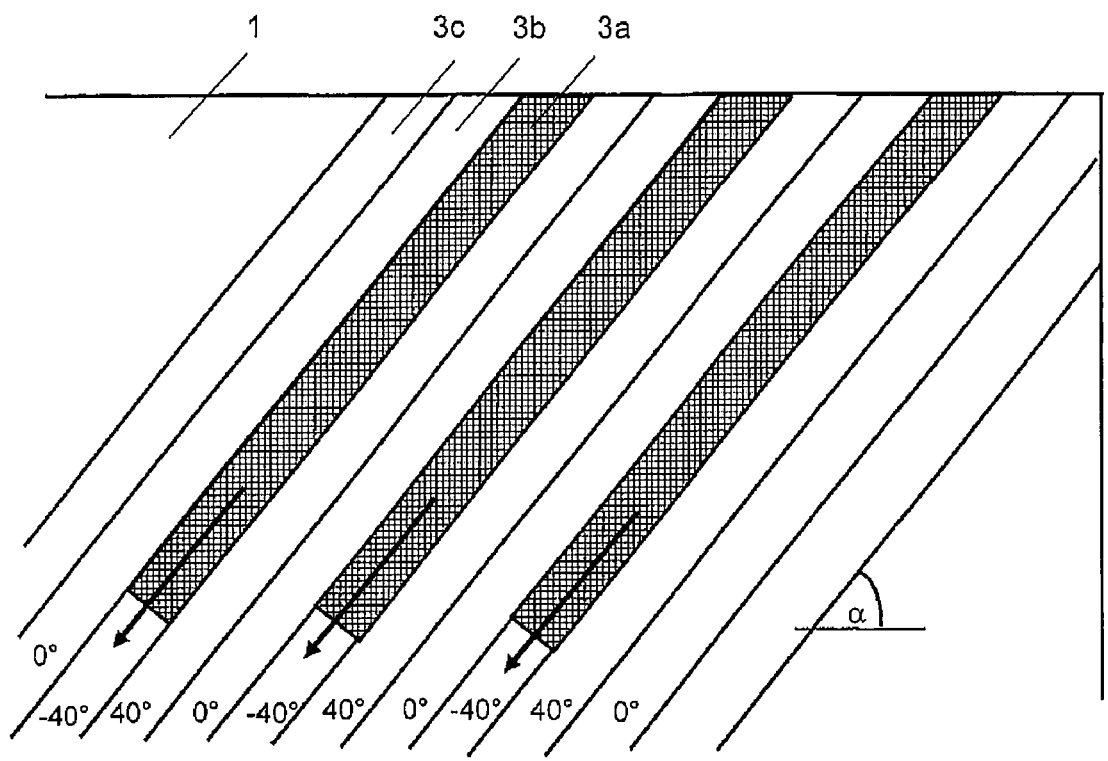
FIG. 4 a schematic partial front view of prism elements arranged according to the invention, illuminated by illumination elements.

FIG. 4 shows, as details, prism elements 3a, 3b and 3c arranged at the angle of inclination, α, in front of a part of an illumination means 1. Here, partly shown prism elements 3a are marked by a pattern. The arrows indicate that the pattern continues over the entire area of the prism elements 3a. The pattern elucidates that at this moment a number of illumination elements SP determined by inverse ray tracing, which can only be assigned to these prism elements 3a, emit light. Therefore the prism elements 3a deflect the ray bundles, after the ray bundles having passed the prism arrangement 3, to the right. Similarly, the prism elements 3c deflect the ray bundles of other illumination elements SP to the left.

By use of this embodiment of the prism elements 3a, 3b and 3c, in combination with the imaging means 2 the ray bundles can establish a viewer region in front of the display, and thus a tracking region of, for example, ±40° as shown. Each prism element, however, does not only cover a single angle, but a region of angles. The deflection value of +40° means that a viewer eye can be in a region ranging from +40° to approximately +10° to be reached by ray bundles. The deflection value of 0° means that a region of angles ranging from +10° to approximately −10° is reached by ray bundles, and for a deflection value of −40° a viewer eye can be reached by ray bundles in a region ranging from −10° to approximately −40°. This results from the fact that always a greater number of illumination elements SP for an imaging element and a prism element 3a, 3b or 3c in each case are activated and illuminates a limited range of angles.

In the following, the working principle of the invention will be described in greater detail on the basis of the essential features of the directional illumination unit for an autostereoscopic display in examples of embodiment.

In FIG. 1, the illumination means 1 is, for example, a light modulator established by a shutter with a multitude of sub-pixels arranged matrix-like, which represent the illumination elements SP. In known way the shutter can here be illuminated from a back-light.

According to another example of embodiment, the illumination means 1 can also consist of self-luminous illumination elements such as LEDs or OLEDs.

In the example of embodiment of FIG. 1, the imaging means 2 comprises a lenticular with cylindrical lenses arranged parallel to each other, and together with the subsequent field lens 4, images the light onto a viewer eye. The field lens 4 is preferably configured as Fresnel lens. It takes part in the deliberate deflection of all ray bundles onto one determined position of a viewer eye in each case in order to create there a defined visibility region.

The ray bundle produced is deflected onto the current position of the viewer eye, according to FIGS. 3a and 3c, by a prism element, opposing the imaging cylindrical lens, of the prism arrangement 3, or passes the prism element 3b without being deflected. As shown in FIG. 2, the optical components 2 and 3 are positioned at an angle of inclination, $\alpha_1$ just as the stripe polarizers 7 assigned to them are. The angle of inclination α is set dependent on the resolution and hence, on the grid dimension of the illumination means 1 used, e.g. the shutter, and the assumed size of the viewers' eye pupils. Based on this geometric-optical dimensioning, in combination with the means that balances the light distribution in vertical direction, the angle of inclination α makes possible to homogenize the brightness in the region to be illuminated of the image reproduction means 6.

DETAILED DESCRIPTION

At the place of each viewer eye, the light of the determined and activated illumination elements SP produces a previously defined visibility region. Out of this visibility region each viewer sees, after synchronous modulation of the ray bundle with a right and/or left stereo image for the respective eye, a desired representation on the image reproduction means 6. The necessary corresponding tracking and image control is carried out in the display by a controller not shown.

The illumination elements SP to be activated for the imaging of the light are determined by the method of inverse ray tracing. In the applicant's patent application PCT/DE 2006/000375, an adequate method is described comprehensively, which is dealt with here only to the extent as understanding the present invention requires: After a three-dimensional position determination of eyes of at least one viewer using a position finder, the position data found are made available to a controller for executing the inverse ray tracing. Dependent on the accuracy of the position finder and/or other parameters such as preferably the distance of the viewer eyes to the display, the controller in discrete steps defines geometry of the visibility region required for the adjacencies of each viewer eye by setting reference points. The number and arrangement, relative to a viewer eye, of the reference points are free of choice. The number of the reference points must be chosen such that the visibility region is constantly illuminated homogeneously, calculation and storage demands, however, being as low as possible.

From each reference point, the controller executes an inverse ray-tracing to image points of the image reproduction means 6, which are located there in a grid and are defined by at least one parameter for instance. Not all reference points are used as basis of the calculations, but preferably only those of the central row. These image points are defined by only one parameter which is the viewing angle of the viewer.

The inverse ray-tracing is, starting from the image points, further executed over the imaging means 2 up to the illumination elements SP. The calculation yields sets of data with address data for that illumination element SP in each case, which is imaged by the imaging means 2 into the corresponding reference point. From the address data a pattern of illumination elements SP to be activated results which is imaged into the above mentioned visibility region for each eye.

While the ray-tracing is executed for the central row of the image reproduction means 6 in real-time, the controller takes stored data sets pre-calculated for the further course of rays from a look-up table, in order to determine the address data of illumination elements SP. In the look-up table the course of rays is pre-calculated for rays from every image point situated on a grid of the image reproduction means 6 and to every illumination element SP of the illumination means 1. This method allows optimizing the number of illumination elements SP to be activated for the current viewer position.

According to this invention, the imaging means 2 and prism arrangement 3 are positioned at the same given angle of inclination α to the vertical axis of the image reproduction means 6. This yields the advantage of a great potential to combine deflection and imaging elements and illumination elements as well. Illumination elements SP can be activated more specifically. Because of the three-part prism structure, only every third prism element 3a, 3b or 3c is involved in the deflection of ray bundles. Depending on whether viewer eyes are central in front of the display or in the right or left region of the viewer space, the respective prism element 3a, 3b or 3c directs the ray bundle to the respective position. According to the invention, the illumination elements SP are no longer to be activated column-per-column, but the course of the inclined prism elements 3a, 3b or 3c is to be considered for the inverse ray-tracing. Therefore the inverse ray-tracing, considering the angle of view, can no longer be executed for the regularly arranged image elements of the central row only of the image reproduction means 6. Every row and every column must be included in the determination of the illumination elements SP to be activated. Also the illumination elements SP are to be considered in the inverse ray-tracing with two coordinates, because they have to be activated due to the inclined location of the imaging elements and the prism elements in different columns and rows.

The ray bundles emerging from the inclined prism arrangement 3 do not yet create a homogeneous distribution of the light in the image reproduction means 6. That is why a means 5 is provided for balancing the light distribution in vertical direction. In combination with said means 5, the light directed in deflected manner by the imaging means 2 and 4 and the prism arrangement 3 is homogenized in the image reproduction means 6. The means balancing the light distribution 5 can, for example, be an element which only vertically disperses at a fixed angle of dispersion or an arrangement of horizontally placed parallel cylindrical lenses with very fine grid dimension.

Simple optical means create a directional illumination unit that has several advantages over prior art.

By combining the imaging means and the prism arrangement jointly arranged inclined in combination with the means that balances the light distribution in vertical direction it is achieved that the brightness in the image reproduction means is homogenized and, at the same time, the deflection range of the ray bundles, or the viewer region in front of a display is extended. In the viewer region several viewers are simultaneously reachable by the tracking and image controller. A visibility region can be assigned to each of them without disturbing influences occurring during viewing 2D and/or 3D representations. Due to the inclined prism structure no additional devices for a vertical spreading of the ray bundle are required.

Other advantages of the invention consist in that commercial illumination means, such as backlight with shutter or active illumination matrices, having a grid can be used independent of the grid of the imaging means and the grid of the image matrix.

This invention is preferably described for a time-sequential representation of stereo images for one viewer eye each, although it is also applicable for displays with spatially interlaced representation.

The invention claimed is:

1. Directional illumination unit for an autostereoscopic display, comprising an illumination means with a multitude of discretely controllable illumination elements arranged in a matrix, and an imaging means with one-dimensionally effective imaging elements arranged in parallel, for activating a certain number of illumination elements for each imaging element, and for imaging pencils of rays which originate in the activated illumination elements sequentially into a viewing space for forming a visibility region on observer eyes, where the imaging means is assigned with a prism array of prism elements arranged in parallel, said prism elements having a three-part prism structure which recurs in the horizontal direction, further comprising a vertical light distribution balancing means, and an image reproduction means, wherein:

the imaging means and the prism array are positioned at the same inclination angle α>0° to the vertical axis of the image reproduction means,
where one prism element of the prism array and one imaging element of the imaging means are of a rod-shaped design, have the same pitch, and form a functional optical unit for optically enlarging a horizontal deflection range of the pencils of rays which originate in the activated illumination elements, and
where each prism element covers an angular range of the created pencils of rays at a set inclination angle α.

2. Directional illumination unit according to claim 1, wherein two prism elements have contrarily inclined optically effective surfaces and that one prism element, which is disposed in between, has a plane surface.

3. Directional illumination unit according to claim 1, wherein the imaging means is a lenticular of cylindrical lenses, and each lens is assigned with one of the prism elements, where the cylindrical lens and the prism element face each other and are as close to each other as possible.

4. Directional illumination unit according to claim 1, wherein the imaging means is additionally assigned with a field lens.

5. Directional illumination unit according to claim 1, wherein a strip polariser is provided each at the illumination means, at the imaging means and at the prism array for suppressing secondary parallel bundles of rays.

6. Directional illumination unit according to claim 1, wherein the vertical light distribution balancing means is an element which diffuses only vertically.

7. Directional illumination unit according to claim 1, wherein the vertical light distribution balancing means is an array of horizontally arranged parallel cylindrical lenses comprising a predetermined lens pitch.

* * * * *